United States Patent
Miesen

(10) Patent No.: US 9,903,166 B2
(45) Date of Patent: Feb. 27, 2018

(54) RECEPTACLE FOR TUBULAR DRILLING TOOLS HAVING DIFFERENT DIAMETERS

(75) Inventor: Rainer Miesen, Bausendorf (DE)

(73) Assignee: ABF BOHRTECHNIK GMBH & CO. KG, Wittlich (DE)

( * ) Notice: Subject to any disclaimer, the term of this patent is extended or adjusted under 35 U.S.C. 154(b) by 71 days.

(21) Appl. No.: 14/235,862

(22) PCT Filed: Jul. 24, 2012

(86) PCT No.: PCT/DE2012/000746
§ 371 (c)(1),
(2), (4) Date: Apr. 15, 2014

(87) PCT Pub. No.: WO2013/017117
PCT Pub. Date: Feb. 7, 2013

(65) Prior Publication Data
US 2014/0339781 A1 Nov. 20, 2014

(30) Foreign Application Priority Data
Jul. 29, 2011 (DE) ........................ 10 2011 108 999

(51) Int. Cl.
B23B 51/04 (2006.01)
E21B 17/046 (2006.01)
B23B 31/107 (2006.01)

(52) U.S. Cl.
CPC ........ *E21B 17/046* (2013.01); *B23B 31/1074* (2013.01); *B23B 31/1075* (2013.01);
(Continued)

(58) Field of Classification Search
CPC .. E21B 17/046; Y10T 408/895; Y10T 408/95; Y10T 408/50; B23B 51/0473;
(Continued)

(56) References Cited

U.S. PATENT DOCUMENTS 1,522,102 A * 1/1925 Cibelli ................ B23B 51/0473
408/186
1,675,469 A * 7/1928 Schreiner ............ B23B 51/0406
408/200
(Continued)

FOREIGN PATENT DOCUMENTS

DE 8627861 U1 12/1986
DE 10 2006 022 613 A1 11/2007
EP 1010854 A1 6/2000

OTHER PUBLICATIONS

International Search Report and Written Opinion for PCT Application No. PCT/DE2012/000746, dated Jun. 12, 2013, 17 pages.

*Primary Examiner* — Daniel Howell
*Assistant Examiner* — Paul M Janeski
(74) *Attorney, Agent, or Firm* — Westman, Champlin & Koehler, P.A.

(57) ABSTRACT

The invention relates to a tool holder on a drill transmission for tubular drilling tools having at least two different diameters, wherein the holder is equipped with a hollow-cylindrical recess and with at least one radially oriented locking bolt which is installed in the wall of the hollow-cylindrical recess and which engages in a corresponding opening in the drilling tool, wherein there is at least one further hollow-cylindrical recess which is complementary to one of the different drilling tools.

5 Claims, 1 Drawing Sheet

(52) U.S. Cl.
CPC ....... *B23B 51/0406* (2013.01); *B23B 51/0473* (2013.01); *Y10T 279/17923* (2015.01); *Y10T 408/895* (2015.01); *Y10T 408/95* (2015.01)

(58) Field of Classification Search
CPC ............ B23B 51/0406; B23B 31/1074; B23B 31/1075
USPC ................................................ 408/204, 207
See application file for complete search history.

(56) References Cited

U.S. PATENT DOCUMENTS

| | | | | |
|---|---|---|---|---|
| 1,855,873 | A | * | 4/1932 | Shortell .............. B23B 51/0473 408/206 |
| 2,484,150 | A | * | 10/1949 | Brown ................ B23B 51/0453 144/23 |
| 3,345,087 | A | * | 10/1967 | Hanes .................... A01K 63/04 285/321 |
| 5,171,111 | A | * | 12/1992 | Kishimoto .......... B23B 51/0426 408/201 |
| 5,782,310 | A | * | 7/1998 | Lange .................... E21B 17/22 175/323 |
| 5,791,837 | A | * | 8/1998 | Johnson .............. B23B 51/0453 408/204 |
| 2005/0031422 | A1 | * | 2/2005 | Tseng ................. B23B 51/0406 408/204 |
| 2007/0137899 | A1 | | 6/2007 | Beccu |
| 2007/0166116 | A1 | * | 7/2007 | Olson ................ B23B 51/0426 408/204 |

* cited by examiner

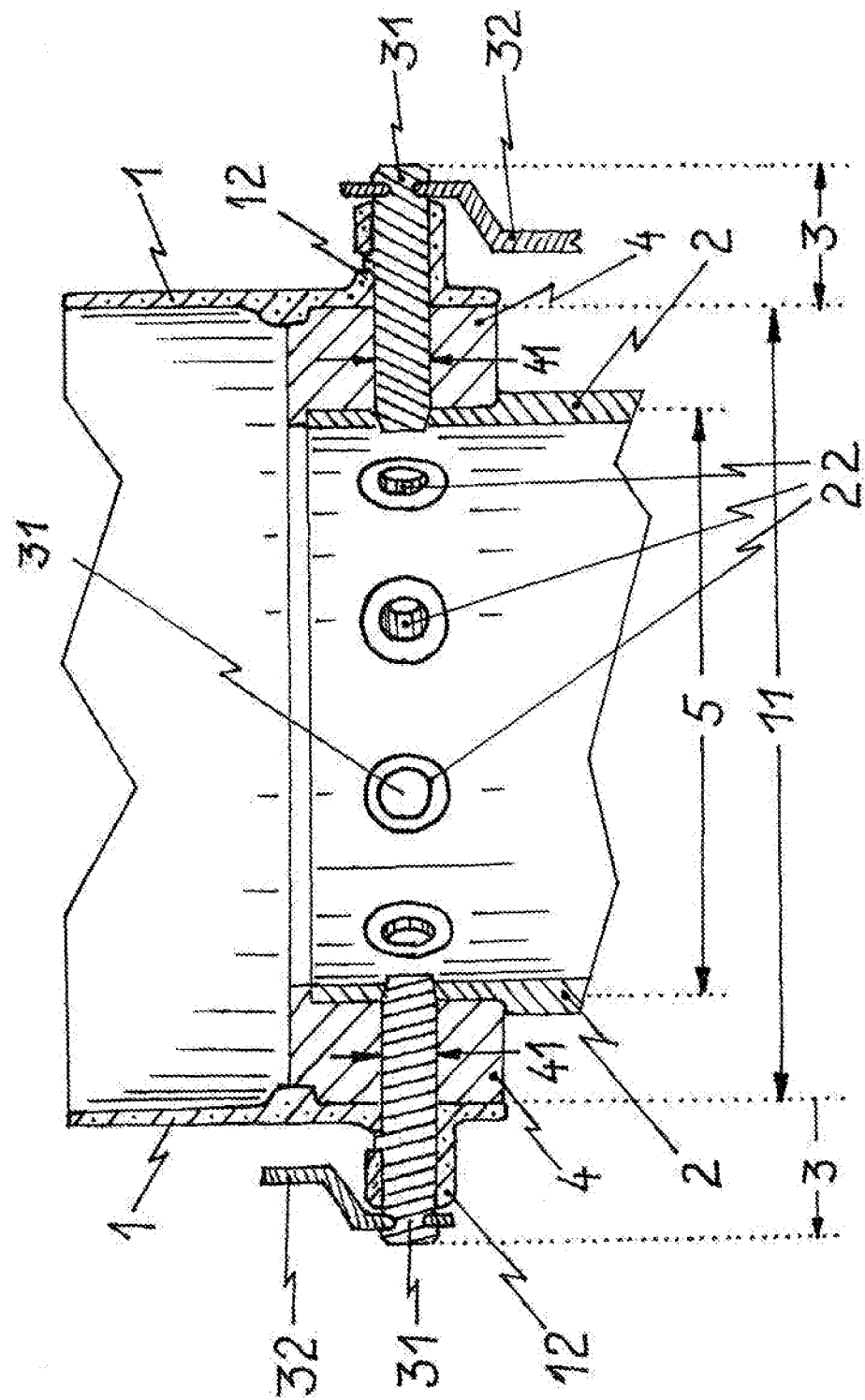

RECEPTACLE FOR TUBULAR DRILLING TOOLS HAVING DIFFERENT DIAMETERS

CROSS-REFERENCE TO RELATED APPLICATION

This Application is a Section 371 National Stage Application of International Application No. PCT/DE2012/000746, filed 24 Jul. 2012 and published as WO 2013/017112 A2 on 7 Feb. 2013, in German, the contents of which are hereby incorporated by reference in their entirety.

The invention relates to a tool receptacle on a drilling gear for tubular drilling tools comprising at least two different diameters, the holder being equipped with a hollow cylindrical recess, the inside width of which corresponds to the exterior dimensions one drilling tool and comprising at least one radially oriented locking bolt, which is installed in the wall of the hollow-cylindrical recess and which engages in a corresponding opening of the drilling tool.

It is part of the prior art in the field of civil engineering that, for introducing bore holes—e.g. for foundation piers—as tool, large-format tubes are driven vertically into the ground by means of rotatory and/or vibratory movements. As drive unit for this, drilling gears are known, which are mounted on the upper end of the drilling tool by means of a tool receptacle and are coupled via locking bolts which are to be inserted laterally into the drilling tool.

In practical use, a preferential value for the diameter of the drilling tools has become established, which is appropriate in particular for large, multi-storey buildings. For relatively small structures, in particular in the direct neighbourhood of already existing buildings, however, foundation piles with such a large diameter are often not required. Here, pile foundations with considerably slimmer piles are sufficient, which result in highly welcome savings in the introduction of the bore and in the costs of the foundation material.

For example, in the case of diversiform buildings that consist of relatively small wings with a lower number of storeys and large building wings with a large number of floors, it is appropriate to adapt the diameter of the foundation piles to the particular need.

In the prior art, therefore, EP 1 010 854 presents a so-called "double-headed drilling unit" which can be changed over to a drilling tool with a different diameter by exchanging a "drive unit". For each diameter value of a drilling tool, an appropriately fitting drive unit in each case is necessary. In the working position of the drilling device it is driven vertically on a vertically oriented rail, the "leader mast." To exchange the drive unit, it must be raised by means of an additional lifting means above the top end of the leader mast, released and temporarily stored on a storage surface. Then a different drive unit, adapted to the new diameter, must be put on and pushed onto the leader mast.

Considerable disadvantages of this arrangement are that, for each further diameter of drilling tubes, a further, relatively complicated drive slide in each case is procured and kept in readiness. In the case of a frequent exchange of the diameter of the drilling tubes, it is particularly obstructive in practical operation that a relatively long time passes until a drilling tube with a different diameter is put on and fastened and the drilling unit can continue drilling.

Against this background, it is the object of the invention to develop a tool receptacle that, with considerably lower costs for investment, permits a simple and rapid exchange to a drilling tool with a different diameter, in one variant, a remote-controlled exchange also being possible without manual intervention in the tool receptacle.

As a solution, the invention teaches that at least one further hollow cylindrical recess is present, which is complementary to the external dimensions of one of the other drilling tools.

It is a significant finding of the invention that a drilling unit can already be operated with a drilling tool of relatively small diameter if only the diameter of the receptacle is adapted to the smaller diameter of the new drilling tool.

In contrast to the patent document mentioned above, an additional change to the gear is by no means inevitably necessary. Rather, because of the smaller diameter of the drilling tool, the necessary torque is also reduced, so that the existing motor and an already existing gear that may possibly be necessary between the motor and drilling tube, works together perfectly with an existing gear, including with a diameter that is smaller than the nominal diameter. The laborious exchange of the drive unit, with its high investment costs and the relatively long time for exchange, are thus eliminated. In particular when rapid and frequent exchange of the diameter of the drilling tools is necessary and the proportion of the bores with a small diameter is only relatively low, a good compromise between the investment costs and the flexibility of the drilling device is achieved with the principle according to the invention. If the proportion of boreholes with a relatively small diameter is relatively very high, it is in principle conceivable to operate the slimmer drilling tool with a higher speed than the largest drilling tool that can be used. In this case, the invention proposes, instead of a switching gear or instead of a gear change, that the drive motor be executed such that, beyond the nominal operating point for the drilling tool with the biggest diameter, it can be operated with a higher speed with simultaneously reduced torque.

For this purpose, for example, an electrical drive motor can be executed in a multipolar manner, or its electrical field—the excitation —can be weakened or the speed of the drive motor is controlled by means of suitable electronics.

It is the decisive feature of the invention to have proven that, for the exchange to a drilling tool with a different diameter, in the tool receptacle, only one further hollow cylindrical recess is to be provided, which is complementary to the respectively desired drilling tool, and which is to be arranged in the same tool receptacle.

In the most general case, no further equipment extending beyond this is required, It is thus a merit of the invention to have recognised that, only with such a simple additional device is an exchange of the diameter of the drilling tools possible at all.

In the patent application, for the sake of clarity, only one tool receptacle is described for two different drilling tools. If, however, three or more different diameters of drilling tools are to be used, the principle of the invention can also be realized for a third, even smaller value of a diameter and for further, even smaller values, by also creating a further, corresponding hollow cylindrical recess for each diameter value.

For the sake of clarity, however, further possible alternative embodiments are only explained in principle for a single, further diameter value.

In a first alternative embodiment, the second hollow cylindrical recess is formed in that, in the first hollow cylindrical recess with the large internal diameter, a spacer ring is used, which has the second hollow cylindrical recess with a smaller internal diameter. To allow the drilling tools also to be fixed in this smaller internal diameter, the spacer ring has passages, through which the locking bolts of the locks for the drilling tool can be pushed into the openings of the drilling tool with the small diameter. The locking bolts are correspondingly extended to the extent that they actually reach into these openings.

If a change has to be made from a first drilling tool with small diameter to a second drilling tool with just as small a diameter, these extended locking bolts must be driven back so far into the spacer ring that the new drilling tool can be perfectly introduced. Therefore, outwardly, the locking bolts do not stand back beyond the outer diameter of the tool receptacle than is necessary for guiding the bolts and for the material thickness of the drilling tool.

If, however, instead of a drilling tool with a small diameter, a drilling tool with a large diameter is to be used, the locking bolts must be driven back into the large, first hollow cylindrical recess. Then, the spacer ring can fall out of the receptacle by virtue of its intrinsic weight and, for example, be received by a cushion.

Alternatively, the spacer ring can also be picked up by a rod, at the end of which a receptacle plate and a central centring cone are manually fastened in the centre with low effort. Then, the large hollow cylindrical recess is free again for a drilling tool with large diameter.

If, in the aforementioned alternative embodiment, only the minimum number of locks necessary for one drilling tool is present, then, for the exchange to a larger drilling tool, in addition to the removal of the spacer ring, the locking bolts of each lock must additionally be exchanged for a shorter instance.

To avoid this procedure, the invention proposes, in a further alternative embodiment, that, in addition to a first row of locks, a second row of locks is additionally installed. In the design, it is appropriate to pivot this second row with respect to one another by about half of the angle between two adjacent locks. The angle with respect to the centre axes of the tool receptacles, which are in all cases oriented radially with respect to the drilling tool and radially with respect to the receptacle. Then, a first row of locks is present, which act with short locking bolts on the large diameter of a drilling tool and a second row of locks, which is pivoted structurally with respect thereto and acts with long locking bolts on a drilling tool with relatively small diameter. In this alternative embodiment, the number of locks is doubled, only every second lock being active in a practical case.

The advantage of these specialized locking units, however, is that the locking bolt can always only be moved from one to the other stop.

If, on the other hand, the number of locking bolts is to be as small as possible, the invention proposes, as another alternative, that only as many locking bolts are present as are actually needed by the drilling tool with the largest number of openings to receive a locking bolt. A considerable difference of this configuration with respect to previous variants, however, is that the locking bolts must be fixable in two different operating positions:

In a first operating position, they only project from the large hollow cylindrical recess to the extent necessary for the insertion into the openings of drilling tools with large diameter.

In a second operating position, the locking bolts are pushed further into the interior space of the tool receptacle, specifically through the passages of the spacer ring until they extend into the openings of the drilling tool with small diameter. Lock according to this principle can also be remotely operated. For example, the locking bolt can project with a lateral guide pin into a guide groove of a cylindrical guiding sleeve of the lock, this guide groove winding spirally around the guide sleeve. Then, the radial position of the locking bolt can be changed by rotation, for example by means of a lever, which is applied at the end of the locking bolt.

It is appropriate to provide further variants in the position of the locking bolt for the "large" diameter of a drilling tool—that is to say between the two end stops of the guide pin—in the spiral groove of a notch, in which the guide pin engages. For receiving a drilling tool with large diameter, the fixing of the locking bolt is then facilitated and is less dependent on exact positioning by the drive of the lock.

In a further refined embodiment, the spacer ring consists of segments that are pivotably fastened on the tool receptacle and project out of the hollow cylindrical receptacle thereof beyond its diameter.

The purpose and one advantage of this arrangement are that, with frequent exchange from the small to the large diameter, the manual removal of the spacer ring is eliminated. Instead, the segments of the spacer ring are moved by remote-controllable drives, which pivot them out of the first large hollow cylindrical recess outward to the extent that they do not collide with the "large" drilling tool.

In this variant, it is appropriate to use the gaps between neighboring segments as passages for guiding through the locking bolts between the segments of a spacer ring. The invention proposes forming these passages by means of spaces between the segments.

To realize the idea according to the invention in which, in addition to a first hollow cylindrical recess for receiving a drilling tool with large diameter, at least one further hollow cylindrical recess for a drilling tool of small diameter is to be provided, the invention presents another essentially different second alternative embodiment.

Instead of a spacer ring, which is inserted into a first large hollow cylindrical recess, in the second alternative embodiment two different hollow cylindrical recesses are incorporated into the tool receptacle, of which the second hollow cylindrical recess has a smaller internal diameter and is disposed above the first hollow cylindrical recess when the tool receptacle is in the operating position. Then a drilling tool with smaller diameter, which is fastened in this second small recess, projects through the first, large recess.

Since, in this alternative, the two recesses are arranged on different points of the longitudinal axis of the tool receptacle, each of the two recesses also has its own locking bolt in each case.

In each of the described variants, the locks can be remotely operated, for example via pneumatic cylinders, hydraulic cylinders or electric drives. Very fast and reliable exchange is thereby achieved.

Since this coupling procedure takes place up to 6 meters height—and depending on the depth and according to the feed velocity of the boring, must be performed very frequently, the efficiency of the drilling too is noticeably increased if such drives push the locking bolt into the drilling tool and also draw it out again.

Further details and features of the invention are explained below in greater detail with reference to an example. The illustrated example is not intended to restrict the invention, but only to explain it. In diagrammatic view, FIG. 1 shows a section through a tool receptacle comprising a plurality of locking bolts.

FIG. 1 shows the section through a tool receptacle 1 according to the invention and a drilling tool 2 fastened therein.

It shows an operating state with the smaller of two different drilling tools 2, which are suitable for this tool receptacle 1. This slim drilling tool 2 is pushed into a spacer ring 4, which in turn fits into the hollow cylindrical recess 11 of the tool receptacle 1.

In FIG. 1 it can be clearly seen that the three aforementioned elements are in each case penetrated by a plurality of locking bolts 31. In the illustrated embodiment, these locking bolts 31 can be pushed into, and rotatably mounted in, a guide sleeve 12 in each case, which are integrally formed on the tool receptacle 1. On the upwardly facing edge of each locking bolt 31, a guide pin can be seen, which projects into a guide groove of the guide sleeves 12.

In FIG. 1, for the sake of clarity, it is not shown that the guide groove runs spirally around the guide sleeve 12. However, it is conceivable that, through pivoting of the locking bolt 31 by means of the crank drive 32, the locking bolt 31 is pivoted about its longitudinal axis and is thereby moved in its longitudinal direction by the guide pin in the guide groove.

In the illustrated state, the locking bolt 31 is inserted as far as the stop of the crank drive 32 and therefore also into the openings 22 of the drilling tool 1.

In FIG. 1 it can be clearly seen that, by drawing back the locking bolt 31 by the wall thickness of the drilling tool 2, the latter can be removed from the spacer ring 4.

To remove the spacer ring 4 from the recess 11 of the tool receptacle 1, the locking bolts 31 must be completely removed from the passages 41 in the spacer ring 4. Then the spacer ring 4 can be removed from the first hollow cylindrical recess 11 of the tool receptacle 1.

In FIG. 1, it can be very clearly seen that a "large" drilling tool 2, whose outer diameter corresponds to the diameter of the hollow cylindrical recess 11, can be inserted therein and can be fixed by pushing back the locking bolt 31 through the openings 22 in the larger drilling tool 1.

Of the total of four locking bolts 31 of the represented variant, two locking bolts 31 can be seen in section and, of one locking bolt 31, that end face that faces into the drilling tool 2, can be seen.

LIST OF REFERENCE CHARACTERS

1 Tool Receptacle
11 Hollow cylindrical recess in the tool receptacle 1
12 Guide sleeve for locking bolts 31
2 Drilling tool 1, can be received by the tool receptacle 1
21 Diameter of the drilling tool 1
22 Opening in the drilling tool 1
3 Lock
31 Locking bolt, movable by the lock 3
32 Crank drive for locking bolt 31
4 Spacer ring, can be inserted in recess 11
41 Passage in the spacer ring 4 for the locking bolts 31
5 Further hollow cylindrical recess

The invention claimed is:

1. A device on a motor-driven drilling gearing for supporting tubular drilling tools for introducing bore holes for foundation piers comprising:
   a tool receptacle including a first hollow cylindrical recess having a first internal diameter and being complementary to drilling tools of a first exterior dimension, and a second hollow cylindrical recess having a second internal diameter and being complementary to drilling tools of a second exterior dimension; and
   at least one radially oriented locking bolt installed in a wall of the tool receptacle that is engageable in an opening of a drilling tool;
   wherein the first internal diameter of the first hollow cylindrical recess is larger than the second internal diameter of the second hollow cylindrical recess; and
   wherein the first and second hollow cylindrical recesses have, at a respective upper end, a bulge or ridge protruding into their respective interiors, said buldge or ridge defining a plane that lies perpendicular to a longitudinal axis of the drilling tool, and said buldge or ridge serving to support a drilling tool inserted into the respective recess against forces acting on the drilling tool in the direction of said longitudinal axis.

2. The device according to claim 1, wherein:
   the device includes a spacer ring in the first hollow cylindrical recess and engaging an interior wall of the first hollow cylindrical recess, the spacer ring including passages for the at least one radially oriented locking bolt, an interior of the spacer ring forming the second hollow cylindrical recess; and
   each of the at least one radially extending locking bolt projects through one of the passages of the spacer ring and into an opening of a drilling tool held in the second hollow cylindrical recess.

3. The device according to claim 2, further comprising:
   a row of locks including short locking bolts, which can be inserted into the openings of a drilling tool with large diameter, and
   long locking bolts,
   which can be pushed through the passages of the spacer ring into the openings of a drilling tool with small diameter,
   wherein the locking bolts can be drawn back into the wall of the first hollow cylindrical recess.

4. The device according to claim 3, wherein the locking bolts
   can be fixed by the locks in a first operating position, in which they only project into the openings of a drilling tool with a diameter corresponding to the diameter of the first hollow cylindrical recess and additionally
   can be fixed by the locks in a second operating position, in which they project into the openings of a drilling tool with small diameter.

5. A device on a drilling gearing for supporting tubular drilling tools comprising:
   a tool receptacle including a first hollow cylindrical recess having a first internal diameter and being complementary to drilling tools of a first exterior dimension, and a second hollow cylindrical recess having a second internal diameter and being complementary to drilling tools of a second exterior dimension; and
   at least one radially oriented locking bolt installed in a wall of the tool receptacle that is engageable in an opening of a drilling tool;
   wherein the first internal diameter of the first hollow cylindrical recess is larger than the second internal diameter of the second hollow cylindrical recess,
   and wherein the device includes a spacer ring in the first hollow cylindrical recess engaging an interior wall of the first hollow cylindrical recess, the spacer ring including passages for the at least one radially oriented locking bolt, an interior of the spacer ring forming the second hollow cylindrical recess; and each of the at least one radially extending locking bolt projects through one of the passages of the spacer ring and into an opening of a drilling tool held in the second hollow cylindrical recess.

* * * * *